United States Patent
Engelhardt

(10) Patent No.: US 8,520,280 B2
(45) Date of Patent: Aug. 27, 2013

(54) METHOD AND APPARATUS FOR DYNAMICALLY SHIFTING A LIGHT BEAM WITH REGARD TO AN OPTIC FOCUSSING THE LIGHT BEAM

(75) Inventor: Johann Engelhardt, Bad Schoenborn (DE)

(73) Assignee: Deutsches Krebsforschungszentrum, Heidelberg (DE)

( * ) Notice: Subject to any disclaimer, the term of this patent is extended or adjusted under 35 U.S.C. 154(b) by 102 days.

(21) Appl. No.: 13/162,055

(22) Filed: Jun. 16, 2011

(65) Prior Publication Data

US 2011/0249311 A1 Oct. 13, 2011

(30) Foreign Application Priority Data

Dec. 19, 2008 (EP) ..................................... 08172450

(51) Int. Cl.
*G02B 26/08* (2006.01)
(52) U.S. Cl.
USPC ...................................... 359/201.2
(58) Field of Classification Search
USPC .................... 359/201.1, 201.2, 385
See application file for complete search history.

(56) References Cited

U.S. PATENT DOCUMENTS

| | | | |
|---|---|---|---|
| 3,013,467 A | 12/1961 | Minsky | |
| 4,678,289 A | 7/1987 | Mattelin et al. | |
| 5,225,923 A | 7/1993 | Montagu | |
| 5,731,588 A | 3/1998 | Hell et al. | |
| 6,211,988 B1 * | 4/2001 | Engelhardt et al. | 359/201.1 |
| 7,662,147 B2 | 2/2010 | Kessler et al. | |
| 7,715,078 B2 | 5/2010 | Okugawa | |
| 2002/0008904 A1 * | 1/2002 | Engelhardt | 359/385 |
| 2003/0214707 A1 * | 11/2003 | Engelhardt | 359/385 |
| 2006/0151449 A1 | 7/2006 | Warner, Jr. et al. | |

FOREIGN PATENT DOCUMENTS

| | | |
|---|---|---|
| DE | 84 28 200 U1 | 5/1986 |
| DE | 40 26 130 A1 | 2/1992 |
| DE | 196 54 210 A1 | 6/1998 |
| DE | 103 21 829 A1 | 12/2004 |

(Continued)

OTHER PUBLICATIONS

Stelzer, Ernst H.K., "The Intermediate Optical System of Laser-Scanning Confocal Microscopes", Handbook of Biological Confocal Microscopy, Third Edition, edited by James B. Pawley, Springer Science+business media, LLC, New York, 2006, Chapter 9, pp. 207-220.

(Continued)

*Primary Examiner* — Euncha Cherry
(74) *Attorney, Agent, or Firm* — Thomas|Horstemeyer, LLP

(57) ABSTRACT

For dynamically shifting a light beam (7) with regard to an optic focussing the light beam to scan an object in a two-dimensional scanning range with the focussed light beam, at least two beam deflectors (26) are connected in series per each direction in which the light beam is to be deflected with regard to the optical axis of the focussing optic. The two beam deflectors deflect the light beam by two deflection angles (31, 32 and 33, 34, respectively) which are dynamically variable independently on each other. The deflection angles (31 to 34) of all beam deflectors (26) are predetermined for each point of the scanning range (35) in such a way that the light beam (7), in scanning the whole two-dimensional scanning range, always runs through the pupil of the optic (4) at essentially the same point.

18 Claims, 5 Drawing Sheets

(56) References Cited

FOREIGN PATENT DOCUMENTS

| | | |
|---|---|---|
| EP | 1 584 310 A | 10/2005 |
| EP | 1 970 744 A1 | 9/2008 |
| WO | 95/21393 A2 | 8/1995 |
| WO | 03/075069 A1 | 9/2003 |

OTHER PUBLICATIONS

International Preliminary Repoort and Written Opinion (English Translation) in co-pending related PCT Application No. PCT/EP2009/067269, mailed Jun. 21, 2011, and International Search Report mailed Feb. 12, 2010.

* cited by examiner

METHOD AND APPARATUS FOR DYNAMICALLY SHIFTING A LIGHT BEAM WITH REGARD TO AN OPTIC FOCUSSING THE LIGHT BEAM

CROSS REFERENCE TO RELATED APPLICATIONS

This application is a continuation in part to International Application PCT/EP2009/067269 entitled "Verfahren und Vorrichtung zur dynamischen Verlagerung eines Lichtstrahls gegenüber einer den Lichtstrahl fokussierenden Optik" with an International Filing Date of Dec. 16, 2009 and claiming priority to European Patent Application No. 08172450.2 also entitled "Verfahren und Vorrichtung zur dynamischen Verlagerung eines Lichtstrahls gegenüber einer den Lichtstrahl fokussierenden Optik", filed on Dec. 19, 2008, now abandoned.

FIELD OF THE INVENTION

The invention relates to an apparatus for dynamically shifting a light beam with regard to an optic focussing the light beam. Further the invention relates to a corresponding method of dynamically shifting a light beam with regard to an optic focussing the light beam.

The invention particularly relates to the field of raster light microscopy in which an object is sampled with a focussed light beam, generally with a focussed laser beam. This sampling is also designated as scanning or rasterizing, and a corresponding apparatus is also known as a beam scanner, laser scanner or raster scanner.

BACKGROUND OF THE INVENTION

In the early times of confocal raster light microscopy, which has the advantage that light emitted by parts of an object which are located outside the focal plane of the microscope objective is not blurring the image of the object of interest in the focal plane, so-called object scanner have been used, which move the respective object with regard to a static light beam. The construction of such an object scanner is described in U.S. Pat. No. 3,013,467. The use of an object scanner allows for a simple, static optic. Due to mechanical inertia, an object scanner, however, only allows for a comparatively low scanning velocity and correspondingly small frame rates. In biology and medicine, the scanning velocities which may be reached with an object scanner are only suitable for fixed dead samples.

Therefore, for imaging living cell structures in biological specimens, beam scanning methods are applied in confocal raster light microscopy, in which the light beam, generally a laser beam, is shifted with regard to an optic focussing the laser beam. Particularly, the light beam is shifted in such a way that it is pivoted about a fixed pivot point in the plane of the pupil of the focussing optic, which is here shortly referred to as the pupil of the focussing optic, to laterally shift the focus point of the light beam in the focal plane of the microscope objective. In microscope objectives of higher magnification, however, the pupil is located within the objective itself, and it is thus not mechanically accessible. Thus, the raster mechanism used has to be placed into an optical image of the pupil of the objective. If the beam pivot point is not exactly in the pupil of the focussing optic, the image brightness strongly drops towards the boundary of the scanning range, which is not acceptable.

Only one beam deflector, like for example a mirror, may be arranged in the pupil of the focussing optic or in each image of the pupil of the optic. For the purpose of scanning the scanning range in two orthogonal directions with a single mirror, it is known from DE 84 28 200 U1 to gimbal-mount the mirror in such a way that it is rotatable about the point of incident of the incident light beam in two orthogonal directions. The mechanical embodiment of this known raster scanner, however, does not allow for high scanning velocities, and the scanning precision is also limited.

Generally, it is possible to provide for two images of the pupil of the focussing optic and to arrange a beam deflector, which deflects the light beam in one of two orthogonal directions with regard to the focussing optic, in each of the two images of the pupil. In this way, however, the optical setup becomes complex and has negative effects on the optical transmission.

If one of two separate rotating mirrors, which are rotatable about orthogonal pivot axes, or if even both of them are not arranged in but only close to a single image of the pupil of the focussing optic, this results in a geometric distortion and aberrations besides a varying image brightness over the scanning range.

An overview over known laser scanners is provided by James B. Pawley: "Handbook of Biological Confocal Microscopy", $3^{rd}$ edition, Springer Verlag, ISBN 10: 0-387-25921-X, ISBN 13: 987-0387-25921-5.

From DE 40 26 130 A1 an apparatus for and a method of dynamically shifting a light beam with regard to an optic focussing the light beam are known, in which a laser beam is deflected in one direction by two rotating mirrors whose rotating movements about parallel pivot axes are coupled according to a fixed mathematical relation in such a way that the laser beam is pivoted about a fixed point of incident on a further rotating mirror. By means of rotating this further rotating mirror, the laser beam is deflected in the second direction. If the point of incidenceis in the entrance pupil of the focussing optic, the common pivot point of the laser beam in both directions falls in the pupil of the focussing optic.

A further apparatus for and a further method of dynamically shifting a light beam with regard to an optic focussing the light beam are known from DE 196 54 210 A1. Here, two mirrors which are fixed with regard to each other in a predetermined relative angle position are provided for deflecting the light beam in a first direction. Thus, these two mirrors are simultaneously rotatable about the optical axis of the incident light beam in such a way that the light beam falls in a fixed point onto a further rotating mirror which is arranged on the extended optical axis of the incident light beam, and which is rotatable about a pivot axis running orthogonally both to the incident light beam and to the deflected light beam. Due to the arrangement of the further rotating mirror in an image of the pupil of the focussing optic, the light beam is pivoted about a single point in the pupil image in both directions. In the known apparatus, further mirrors may be provided to pivot the focussed light beam about the optical axis of the incident light beam.

In recent time, methods of high resolution raster light microscopy have been developed, which achieve spatial resolutions beyond the diffraction barrier. One example for these high resolution methods is STED (Stimulated Emission Depletion) microscopy as described in WO 95/21393 A. The new high resolution methods place much higher demands on imaging the light beam, by which the scanning range is scanned, into the pupil of a focussing optic than common raster light microscopy. For example, in STED microscopy, a first fluorescence excitation light beam is used for fluorescence excitation like in confocal raster light microscopy. Additionally, however, a second stimulation light beam is used, which avoids the occurrence of fluorescence in the boundary of the diffraction-delimited spot of the focused excitation light beam. For this purpose, the intensity distribution of the stimulation light in the focal plane of the focussing optic is made ring-shaped, for example. To provide an intensity zero point in the center of the intensity distribution of the stimulation light, i. e. at the focus point of the excitation light, the electrical field of the stimulation light beam is spatially modulated in an image of the pupil of the objective by means of so-called phase plates or phase modulators for example in such a way that the integral of the electric field over the pupil becomes zero. In practical applications of STED microscopy, the remaining intensity of the stimulation light in the zero point of the intensity distribution has to be smaller than one percent of the maximum ambient light intensity to not also eliminate the measurement signal of interest from the focus point of the excitation light. As a result, in scanning the scanning range by deflecting the excitation and the stimulation light beam, the spatial phase structure of the stimulation light beam in the pupil of the focussing optic may only be moved by a very small fraction of the pupil diameter, for certain phase plates by only about one thousandth of the pupil diameter at maximum. With known light scanner types, this criterion, if met at all, is only met with an extreme effort, i.e. with highest-value optical components for the rotating mirrors and for the focussing optic.

From US 2006/0151449 A1 a system and a method for scanning a surface with a collimated beam are known. The collimated light beam, for example a laser beam, is laterally shifted in parallel to its optical axis by means of two pairs of beam deflectors, such as mirrors. The beam deflectors are arranged in series along the beam path, each of them being rotatable about one of the following axes: two pivot axes running in parallel to each other and perpendicular to the light beam and two further pivot axes running in parallel to each other and perpendicular to the light beam but also perpendicular to the first two axes. The two beam deflectors of each pair of beam deflectors which are rotatable about parallel pivot axes are both pivoted by same angles in the same direction to provide for a parallel shift of the laser beam. Thus, for example, rotating mirrors as beam deflectors are arranged in pairs whose surface normals are anti-parallel in each operation position of the known system. The laser beam is not focused in this known system and method.

There still is a need for an apparatus for and a method of dynamically shifting a light beam with regard to an optic focussing the light beam, by which, without high practical or constructional effort, it is possible to pivot the light beam about a fixed pivot point in the pupil of the focussing optic in two directions to scan a two-dimensional scanning range without variations of the optical conditions over the scanning range.

SUMMARY OF THE INVENTION

In an aspect, the present invention provides an apparatus for dynamically shifting a light beam with regard to an optic, which focuses the light beam and which comprises an optical axis and a pupil, to scan an object with the focussed light beam in a two-dimensional scanning range. The apparatus comprises: beam deflectors which deflect the light beam in two different directions with regard to the optical axis of the optic; and a controller for controlling the beam deflectors. Each beam deflector deflects the light beam in one direction by a deflection angle which is dynamically variable by the controller. Per each dimension of the two-dimensional scanning range, at least two beam deflectors are connected in series which, in a same one of the two directions, deflect the light beam by two deflection angles which are dynamically variable by the controller independently on each other; and the controller predetermines the deflection angles of all beam deflectors for each point of the two-dimensional scanning range in such a way that the light beam, in scanning the whole two-dimensional scanning range, always runs through a same point of the pupil of the focussing optic.

In another aspect, the present invention provides a method of dynamically shifting a light beam with regard to an optic, which focuses the light beam and which comprises an optical axis and a pupil, to scan an object with the focussed light beam in a two-dimensional scanning range. The method comprises deflecting the light beam in two different directions with regard to the optical axis of the optic by dynamically variable deflection angles. Per each dimension of the two-dimensional scanning range, the light beam, in a same one of the two directions, is deflected at two points following each other along the light beam by two deflection angles which are dynamically variable independently on each other; and all deflection angles for each point of the two-dimensional scanning range are predetermined in such a way that the light beam, in scanning the whole two-dimensional scanning range, always runs through a same point of the pupil of the focussing optic.

In a further aspect, the present invention provides a raster light microscope, particularly a STED raster light microscope, which comprises: an excitation light source providing an excitation laser beam, an optic focussing the laser beam and comprising an optical axis and a pupil, and a laser scanner dynamically shifting the excitation laser beam with regard to the optic to scan an object with the focussed excitation laser beam in a two-dimensional scanning range. The laser scanner comprises: beam deflectors which deflect the excitation laser beam in two different directions with regard to the optical axis of the optic; and a controller for controlling the beam deflectors. Each beam deflector deflects the excitation laser beam in one direction by a deflection angle which is dynamically variable by the controller. Per each dimension of the two-dimensional scanning range, at least two beam deflectors are connected in series which, in a same one of the two directions, deflect the excitation laser beam by two deflection angles which are dynamically variable by the controller independently on each other; and the controller predetermines the deflection angles of all beam deflectors for each point of the two-dimensional scanning range in such a way that the excitation laser beam, in scanning the whole two-dimensional scanning range, always runs through a same point of the pupil of the focussing optic.

The raster light microscope according to the present invention may further comprise a stimulation light source providing a stimulation laser beam, which is coaxial with regard to the excitation light beam and whose electric field is modulated in such a way that an integral of the electric field over the pupil of the focussing optic is zero. The laser scanner dynamically shifts this stimulation laser beam with regard to the optic by means of the same beam deflectors deflecting the excitation light beam.

When the beam deflectors are located around an intermediate image of the scanning range, then already the first image of the pupil is available for the arrangement of phase plates in a STED microscope, and the image of the phase plate in the pupil of the objective can be kept fixed in place while scanning the scanning range. In an other case, when the STED phase plate is located right behind the microscope objective then the pivot point of the beam scanner of the present invention may be calibrated axially for the best compromise. In the case in which the beam deflectors are located around an intermediate image plane, it is still another advantage that the beam diameter at this intermediate image plane is typically much smaller than at the pupil. This allows for use of thinner and more light weight deflection mirrors which in turn allow for faster scanning velocities.

Other features and advantages of the present invention will become apparent to one with skill in the art upon examination of the following drawings and the detailed description. It is intended that all such additional features and advantages be included herein within the scope of the present invention, as defined by the claims.

SHORT DESCRIPTION OF THE DRAWINGS

The invention will be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

Figure 1:
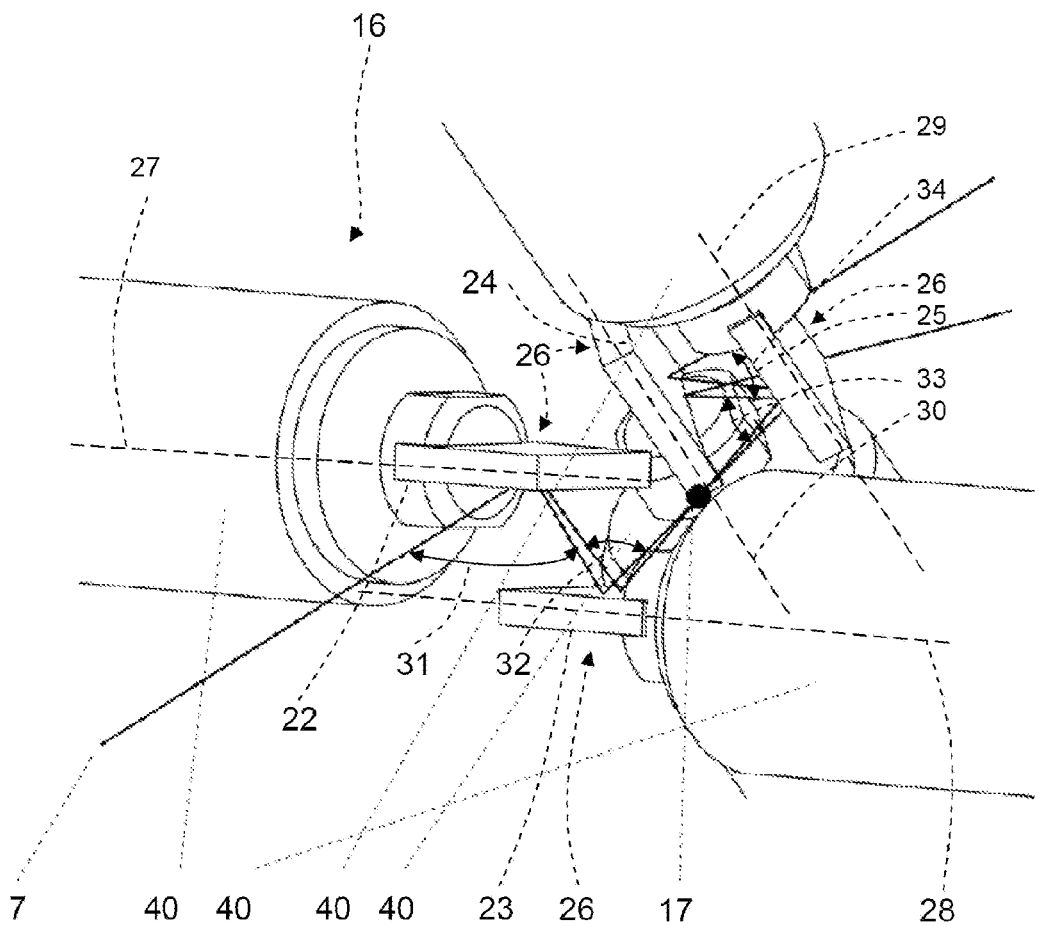
FIG. 1 shows an arrangement of four galvanometer-driven rotating mirrors which may be used as beam deflectors in the present invention.

In the apparatus according to the present invention, at least two and also preferably two beam deflectors are connected in series per direction in which the light beam shall be deflected with regard to the optical axis of the focussing optic to shift it in this direction within the scanning range. The two beam deflectors deflect the beam of light in the same plane but at two points following each other, each by one deflection angle. These two deflection angles are dynamically variable independently on each other. Due to the combination of the independent dynamic variability of the two deflection angles, both the beam position of the light beam in the respective direction within the pupil of the focussing optic and the angle of the light beam with regard to the optical axis of the focussing optic and thus the position of the focussing light beam in the scanning range can be adjusted individually. This particularly means that the beam position in the pupil can be held constant in scanning the scanning range. This possibility is given for both directions in which the light beam is to be deflected to scan the scanning range, independently on how close the beam deflectors are to the pupil or to an image of the pupil of the focussing optic. The beam deflectors may thus particularly be arranged at a position of the beam path which is freely accessible anyway. There is no need to provide a special place for them and, particularly, no extra images of the pupil of the focussing optic have to be provided.

By means of the degrees of freedom provided by the two beam deflectors acting independently on each other, not only distances of the beam deflectors to the pupil or to an image of the pupil of the focussing optic but also lens errors of the focussing optic and/or errors of the beam deflectors themselves may be compensated for. This means that the criterion of rotating the light beam about a fixed point in the pupil of the optic can be met better with the apparatus according to the present invention than with an ideal mirror in the pupil of the focussing optic, as even an ideal mirror, in contrast to two beam deflectors connected in series per direction, can not compensate for imaging errors of the optic. With the apparatus according to the invention, the pivot point of the deflected light beam may purposefully be predetermined in axial direction or shifted in axial direction to, for example, account for different axial positions of different objectives.

To make use of these compensation options, a controller for the beam deflectors is provided which predetermines the deflection angles of the at least four beam deflectors for each point of the scanning range. Thus, a fixed value of each of the deflection angles is associated with each point of the scanning range. In this way, the four deflection angles are correlated with each other. In scanning the scanning range, however, they do often not exactly vary in a fixed mathematical relation with regard to each other but more generally in such a way that the ideal deflection angles are individually adjustable for each point of the scanning range.

Particularly, the ideal deflection angles for each point of the scanning range may be determined by the controller in such a way that the light beam always runs through the pupil of the focussing optic at the same point, Preferably, the light beam, with its center of intensity, runs through the center of the pupil.

The values of the individual deflection angles following each other in scanning the scanning range are preferably predetermined by the controller in such a way that the scanning range is scanned with the focussed light beam in a predetermined raster pattern. This predetermined raster pattern, for example, consists of exactly parallel lines of same distances, along which the focussed laser beam is moved at a constant velocity. Such a distortion-free pattern allows for allocating a measurement signal coming out of the area of the focussed light beam to a certain point of the scanning range simply based on its point in time.

In the apparatus of the invention, a beam position determination device for determining a beam position in the pupil or in an image of the pupil of the optic and a further beam position determination device for a simultaneously determining a beam position in the scanning range or in an image of the scanning range may be provided to obtain the values of the deflection angles for each point of the scanning range. In this way, it may be surveyed that the beam position in the pupil remains constant and that a certain beam position in the scanning range is associated with the adjusted deflection angles. Further, using the two beam position determination devices in a reversed direction, the consecutions of the values of the deflection angles, which are needed to scan the scanning range in a desired pattern, may be determined.

The beam deflectors of the apparatus according to the invention may generally deflect the light beam at any arbitrary position. Some positions along the light beam, however, prove to be advantageous for deflecting the light beam exactly in the desired way. All positions at which the light beam is collimated belong to these preferred positions. In contrast to the method known from US 2006/0151449 A1, a collimated light beam is tilted with regard to the optical axis of the focussing optic in the present invention to meet the criterion that the light beam always runs through the pupil of the optic at the same point.

When the beam deflectors of the apparatus of the invention deflect a previously focussed laser beam, they laterally translate the focussed light beam with regard to the optical axis of the optic to meet that same criterion. The resulting variation of the beam length of the light beam, however, does not result in an axial shift of the focus of the light beam of the same size. The effective lateral shift of the focus is proportional to the image diminution of the focussing optic between the beam deflectors and the focus of the light beam. On the contrary, the axial shift of the focus is proportional to the square of the image diminution. This means that the axial focus error in the object space is reduced in the present apparatus by the magnification factor of the optic between the object space and the beam deflectors. In a microscope comprising an objective magnifying, for example, by 100, through which the light beam is focussed in diminution direction, the absolute focus error which is caused by the lateral deflection of the light beam and which becomes effective in the object space is reduced to a tenthousandth and thus to negligible small values.

With a previously focussed laser beam, the beam deflectors can be arranged around an image of the pupil of the focussing optic. Doing so, nothing stands against providing one beam deflector exactly in the image of the pupil. However, in the apparatus according to the invention, it is particularly advantageous, that the beam deflectors may also be arranged around an intermediate image of the scanning range. Here too, one of the beam deflectors may be exactly arranged in the intermediate image. In raster microscopes, such an intermediate image is often freely accessible with regard to the typical size of beam deflectors like, for example, galvanometer-driven rotating mirrors. In the apparatus of the invention, such rotating mirrors are preferably made in such a way that they are rotatable about a pivot axis running within their mirror plane. Correspondingly, the two beam deflecting rotating mirrors for each direction in which the light beam is deflected are rotatable about parallel pivot axes.

In the method of the invention, the beam of light is deflected at two points following each other by two independently dynamically variable deflection angles in each direction. The light beam is preferably deflected by a total of four deflection angles in such a way that it always runs through the pupil of the optic focussing it. Further, it is preferred that the light beam is deflected by the deflection angles in such a way that the scanning range is scanned with the focussed light beam in a predetermined distortion-free pattern. To allow for this, the deflection angles have to be separately determined and stored for each point of the scanning range as their ideal values also account for imaging errors of the optic and errors of the beam deflectors used for deflecting the light beam.

To determine the four deflection angles for each point of the scanning range, a beam position of the light beam in the pupil or in an image of the pupil may be monitored to hold it constant, while a beam position in the scanning range or in an image of the scanning range is monitored at the same time to determine the point of the scanning range reached with the light beam by each set of deflection angles. On the other hand, a sequence of the sets of the deflection angles may be predetermined to scan the scanning range in a desired raster pattern.

It has already been indicated in the context of the apparatus according to the invention that the location at which the light beam is deflected is not particularly critical in the present invention, although some locations are preferred for this purpose. The areas in which the light beam is collimated belong the these locations. Further advantageous locations are close to the pupil of the optic (so far as accessible) and each image of the pupil of the optic. Particularly, it is also possible to effect the deflection of the light beam according to the present invention in the area of an intermediate image of the scanning range and to nevertheless shift the effective pivot point of the light beam with regard to the optical axis into the pupil of the focussing optic.

Whereas the present invention is not limited to particular applications, it proves to be particularly advantageous in high resolution raster light microscopy, when the electrical field of at least one component of the coherent light beam is modulated for example in such a way that the integral of the electric field over the pupil of the focussing optic is zero. Meeting this criterion with the integral of the electrical field of a stimulation light beam in STED microscopy results in an intensity distribution of the stimulation light, which comprises a zero point at the geometric focus point of the light beam. This zero point is known to be extremely sensitive with regard to an offset of the light beam with regard to the center of the pupil of the focussing optic and to any aberrations. Any such offset, however, is easily avoided by application of the present invention. Further, the present invention is not dependent on very high value optical components for the focussing optic or the beam deflectors, because due to the degrees of freedom provided by two beam deviations per each direction in which the scanning range is scanned, many occurring errors may be compensated for.

Referring now in greater detail to the drawings, FIG. 1 shows a scanning arrangement 16 of four rotating mirrors 22 to 25 which are each driven by a galvanometer 40. These rotating mirrors 22 to 25 may be used as beam deflectors 26 for a light beam 7 in the present invention. In each direction, two beam deflectors 26, i. e. the rotating mirrors 22 and 23, on the one hand, and the rotating mirrors 24 and 25, on the other hand, deflect the light beam 7 in two points following each other by deflection angles 31 and 32, and 33 and 34, respectively. Correspondingly, the two deflection angles 31 and 32, on the one hand, and the deflection angles 33 and 34, on the other hand, are essentially in one plane. For this purpose, the rotating mirrors 22 and 23 are rotatable about two parallel pivot axes 27 and 28, whereas the rotating mirrors 24 and 25 are rotatable about two further pivot axes 29 and 30 which are essentially orthogonal with regard to the pivot axes 27 and 28 and essentially parallel with regard to each other. All rotating movements of the rotating mirrors 22 to 25 about the pivot axes 27 to 30 are controllable independently on each other. Thus, both an angle of the emerging light beam 7 with regard to the optical axis of an optic following the scanning arrangement 16 and focussing the light beam 7 is adjustable in two lateral directions and a position of a pivot point of the light beam 7 about which the emerging light beam 7 is tilted by this angle is adjustable in longitudinal direction of the optical axis. As a result, by controlling the beam deflectors 26, this pivot point may be held spatially fixed over all changes of the angle position of the light beam 7. Particularly, the pivot point can be held fixed at the point of an image 17 of the pupil of the focussing optic. This is particularly easily realized when the beam deflectors 26 are arranged around this image 17, as it is depicted in FIG. 1. The galvanometer-driven rotating mirrors 22 to 25 depicted in FIG. 1 are only one specific example of the beam deflectors 26 of the present invention. Alternatively, acousto-optical or electro-optical beam deflectors, piezo-electric driven mirrors, so-called MEMS (Micro-Electro-Mechanical-Systems) and the like may also be used as the beam deflectors 26.

Figure 2:
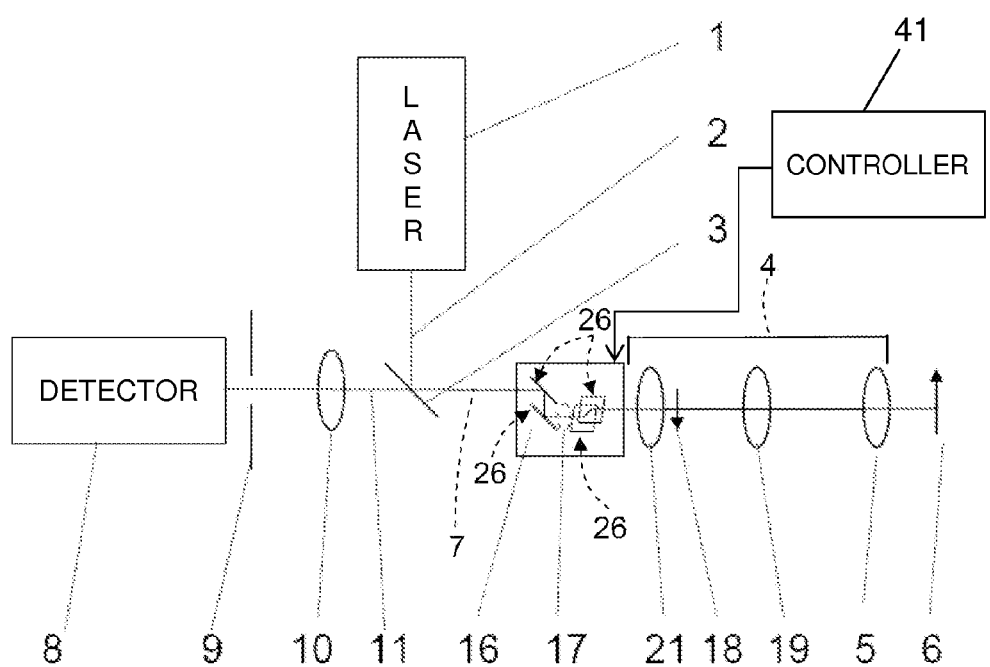
FIG. 2 illustrates a confocal raster light microscope in which the invention is realized in the area of an image of the pupil of its objective.

FIG. 2 illustrates the integration of the scanning arrangement 16 in a confocal raster light microscope. A fluorescence excitation laser 1 supplies a fluorescence excitation laser beam 2 which is guided via a chromatic beam splitter 3 as a light beam 7 through the scanner arrangement 16 into a focussing optic 4 which focusses it into an object 6. Here, the focussing optic 4 is made of a scanning lens 21, a tubus lens 19 and an objective 5, and it images the object 6 in an intermediate image 18. The detection light 11 coming back from the object 6 is de-scanned by the scanning arrangement 16 and recorded by a detector 8 in a confocal arrangement which is realized by a focussing lens 10 and a pinhole 9.

Figure 3:
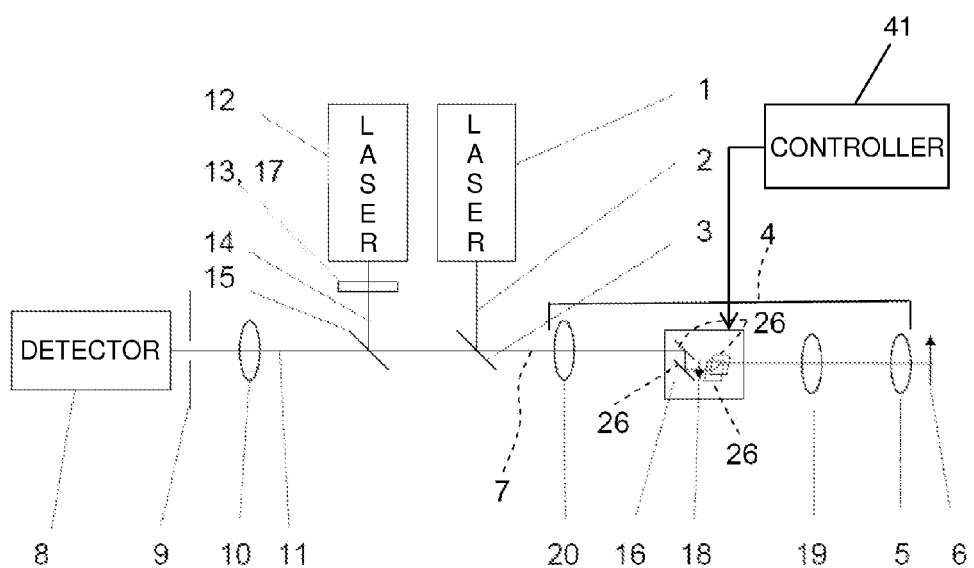
FIG. 3 shows the construction of an STED raster light microscope in which the invention is realized in the area of an intermediate image of its objective.

The STED fluorescence light microscope illustrated in FIG. 3 records the detection light 11 from the object 6 also with the detector 8 in a confocal arrangement behind the focussing lens 10 and the pinhole 9. Here, in addition to the setup according to FIG. 2, a stimulation laser 12 is provided which supplies a stimulation laser beam 14. The stimulation laser beam 14 forms a further component of the light beam 7 and, for this purpose, it is coupled-in via a further chromatic beam splitter 15. Prior to that, however, the electrical field of the stimulation laser beam 14 is modulated in an image 17 of the pupil of the optic 4 by means of a plate 13 for example in such a way that the Integral of the electric field over this image 17 of the pupil is zero. If this criterion is exactly met, the intensity distribution of the stimulation laser beam 14 has a zero point at the geometric focus point of the light beam 7 in the object 6, at which, in contrast to the surroundings of the geometric focus point, the stimulation laser beam 14 does not eliminate the emission of fluorescence light by the fluorescence dye in the object 6 which has been excited by the excitation light beam 2. In this way, the spatial range out of which the detection light 11 may origin, is reduced below the diffraction barrier. Further, differing from FIG. 2, the scanning arrangement 16 is not arranged around the image 17 of the pupil of the optic 4 in FIG. 3 but around the intermediate image 18. This location is usually particularly well accessible in a raster light microscope. Due to the degrees of freedom of the scanning arrangement 16 with regard to the position of the pivot point about which the light beam 7 is effectively pivoted, this pivot point may nevertheless be held in the pupil (not depicted here) of the optic 4 so that the criterion that the integral of the electric field of the stimulation laser beam 14 over the pupil of the focussing optic is zero may also be met in scanning the object 6. Because of the dislocation of the scanning arrangement 16, the first lens of the focussing optic 4 is no scanning lens in a closer sense and is thus designated as a collimation lens 20, here.

Figure 4:
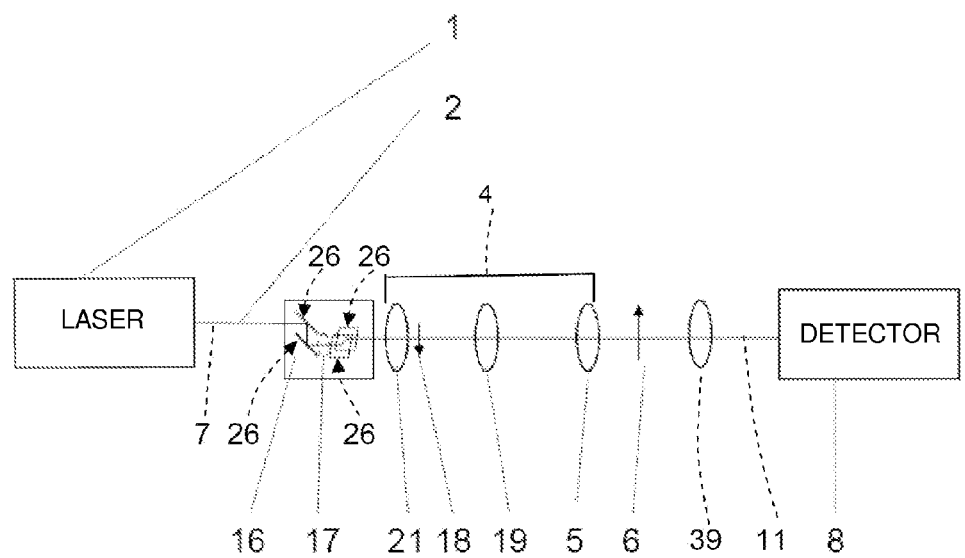
FIG. 4 illustrates a raster light microscope with detection according to a transmitted light method, in which the invention is realized in the area of an image of the pupil of its objective.

The raster light microscope illustrated in FIG. 4 comprises the detector 8 in a transmission arrangement behind the object 6 and a further objective 39. This means that the detection light 11 from the object 9 is not de-scanned with the scanning arrangement 16, here. Correspondingly, the detector is not arranged in a confocal arrangement but may comprise a two-dimensional sensor array for recording an image of the object 6, the spatial allocation being made by means of the image points of the sensor array. Instead of a sensor array a large area detector may be used, the spatial allocation being made by means of the position of the focus point of the excitation light beam which is also an option with a sensor array. Otherwise, the setup of the raster light microscope according to FIG. 4 corresponds to that one according to FIG. 2.

For each point of the object 6 to be scanned, the four deflection angles 31 to 34 according to FIG. 1 have to be determined by which the conditions are met that the desired point in the object space is met and that the light beam 7 runs through the center of the pupil of the focussing optic 4. These quadruples of deflection angles are determinable with common means and storable and usable in a controller 41 for the beam deflectors 26. Thus, in a calibration phase or even during the actual imaging process, detectors, like for example four quadrant diodes, position sensitive diodes, CCD cameras or the like, may be placed in the pupil or the object space or in images of the pupil or the object space to determine and store the necessary control signals or results of these control signals. Generally, these control signals or results are then used in actually imaging the object to predetermine the necessary quadruples of deflection angles for the beam deflectors. The predetermination may be made point by point or in an interpolating way. A point by point determination is preferred over an interpolating determination as an interpolation is always based an continuous conditions, which do not have to be present with local imaging errors, for example. The calibration thus eliminates both optical imaging distortions and inaccuracies of the beam positions caused by mechanical inaccuracies in the setup. By application of the invention, the requirements with regard to the inherent precision of the components used as well as with regard to the setup of the opto-mechanical system and its adjustment are considerably reduced.

Figure 5:
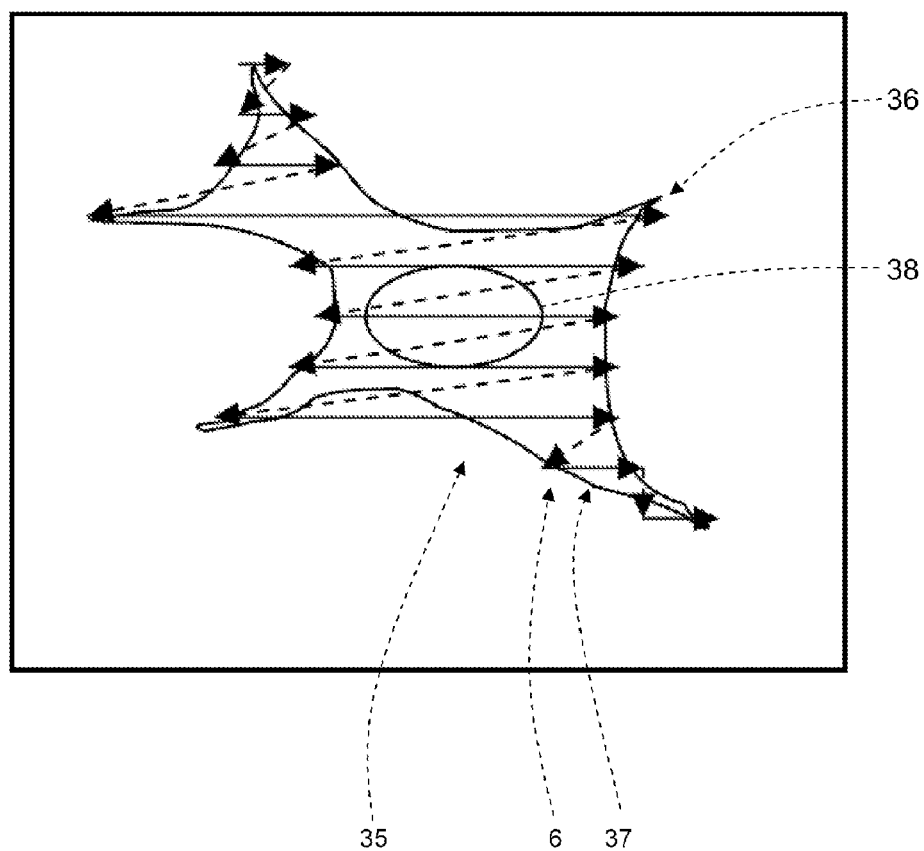
FIG. 5 illustrates an adaptive scanning method according to the present invention.

Nevertheless, a very precise beam control is possible in operation of the apparatus according to the present invention. Thus, fast adaptive raster patterns 36 according to which the respective scanning range 35 of the object 6 is scanned with the focussed light beam 7 are possible when using small rotating mirrors 22 to 25 with low mechanical inertia. In this way, for example, dark background areas or object areas which are not of interest for other reasons, may be ignored to achieve a higher frame repetition rate due to the reduced number of picture elements or pixels. This is illustrated in FIG. 5, where a raster pattern 36 in the scanning range 35 is depicted that covers a cell 37 including a nucleus 38 as the object 6 of interest but which does not significantly go beyond this cell 37.

Many variations and modifications may be made to the preferred embodiments of the invention without departing substantially from the spirit and principles of the invention. All such modifications and variations are intended to be included herein within the scope of the present invention, as defined by the following claims.

LIST OF REFERENCE NUMERALS 1 fluorescence excitation laser
2 fluorescence excitation laser beam
3 chromatic beam splitter
4 focussing optic
5 objective
6 object
7 light beam
8 detector
9 pinhole
10 focussing lens
11 detection light
12 stimulation laser
13 phase plate
14 stimulation laser beam
15 chromatic beam splitter
16 scanning arrangement
17 image of the pupil
18 intermediate image
19 tubus lens
20 collimation lens
21 scanning lens 22 rotating mirror
23 rotating mirror
24 rotating mirror
25 rotating mirror
26 beam deflector
27 pivot axis
28 pivot axis
29 pivot axis
30 pivot axis
31 scanning angle
32 scanning angle
33 scanning angle
34 scanning angle
35 scanning range
36 pattern
37 cell
38 nucleus
39 objective
40 galvanometer
41 controller

The invention claimed is:

1. An apparatus for dynamically shifting a light beam with regard to an optic, which focuses the light beam and which comprises an optical axis and a pupil, to scan an object with the focussed light beam in a two-dimensional scanning range, the apparatus comprising:
beam deflectors which deflect the light beam in two different directions with regard to the optical axis of the optic; and
a controller for controlling the beam deflectors;
wherein each beam deflector deflects the light beam in one direction by a deflection angle which is dynamically variable by the controller;
wherein, for a first dimension of the two-dimensional scanning range, at least a first beam deflector and a second beam deflector are connected in series which are controllable independently on each other and which, in a first one of the two directions, deflect the light beam by a first deflection angle and a second deflection angle, the first deflection angle and the second deflection angle being dynamically variable by the controller independently on each other;
wherein, for a second dimension of the two-dimensional scanning range, at least a third beam deflector and a fourth beam deflector are connected in series which are controllable independently on each other and which, in a second one of the two directions, deflect the light beam by a third deflection angle and a fourth deflection angle, the third deflection angle and the fourth deflection angle being dynamically variable by the controller independently on each other and on the first deflection angle and the second deflection angle; and
wherein the controller predetermines the deflection angles of all beam deflectors for each point of the two-dimensional scanning range in such a way that the light beam, in scanning the whole two-dimensional scanning range, always runs through a same point of the pupil of the focussing optic.

2. The apparatus of claim 1, wherein the controller predetermines a sequence of deflection angles of all beam deflectors in such a way that the two-dimensional scanning range is scanned with the focussed light beam in a predetermined raster pattern.

3. The apparatus of claim 1, and further comprising a first beam position determination device for determining a beam position of the light beam in a first plane which is selected from the pupil and an image of the pupil of the focussing optic, and a second beam position determination device for determining a beam position of the light beam in a second plane which is selected from the scanning range and an image of the scanning range.

4. The apparatus of claim 1, and further comprising a collimation optic collimating the light beam prior to its incident on the beam deflectors, wherein the beam deflectors tilt the collimated light beam with regard to the optical axis of the focussing optic.

5. The apparatus of claim 1, wherein the focussing optic begins to focus the light beam prior to its incident on the beam deflectors and wherein the beam deflectors laterally translate the focussed light beam with regard to the optical axis of focussing optic.

6. The apparatus of claim 5, wherein the beam deflectors are arranged around an image selected from an image of the pupil of the focussing optic and an intermediate image of the scanning range.

7. The apparatus of claim 1, wherein the beam deflectors include rotating mirrors which are each rotatable about a pivot axis running within its mirror plane.

8. The apparatus of claim 1, wherein the beam deflectors include rotating mirrors which are each rotatable about a pivot axis running in parallel to its mirror plane.

9. A method of dynamically shifting a light beam with regard to an optic, which focuses the light beam and which comprises an optical axis and a pupil, to scan an object with the focussed light beam in a two-dimensional scanning range, the method comprising:
deflecting the light beam in two different directions with regard to the optical axis of the optic by dynamically variable deflection angles;
wherein, for a first dimension of the two-dimensional scanning range, the light beam, in a first one of the two directions, is deflected at a first point and a second point following each other along the light beam by a first deflection angle and a second deflection angle, the first deflection angle and the second deflection angle being dynamically variable independently on each other;
wherein, for a second dimension of the two-dimensional scanning range, the light beam, in a second one of the two directions, is deflected at a third point and a fourth point following each other along the light beam by a third deflection angle and a fourth deflection angle, the third deflection angle and the fourth deflection angle being dynamically variable independently on each other and on the first deflection angle and the second deflection angle; and
wherein all deflection angles for each point of the two-dimensional scanning range are predetermined in such a way that the light beam, in scanning the whole two-dimensional scanning range, always runs through a same point of the pupil of the focussing optic.

10. The method of claim 9, wherein all deflection angles for each point of the two-dimensional scanning range are predetermined in such a way that the light beam, with its center of intensity, always runs through the center of the pupil of the focussing optic.

11. The method of 9, wherein all deflection angles for each point of the two-dimensional scanning range are predetermined in such a way that the scanning range is scanned with the focussed light beam in a predetermined raster pattern.

12. The method of claim 9, and further comprising the initial steps of determining and storing all deflection angles for each point of the scanning range, wherein a beam position in a first plane selected from the pupil and an image of the pupil of the focussing optic, and a beam position in a second plane selected from the scanning range and an image of the scanning range are simultaneously determined.

13. The method of claim 9, wherein the light beam is collimated prior to being deflected, and wherein the light beam is tilted with regard to the optical axis of the focussing optic by being deflected.

14. The method of claim 9, wherein the light beam is focussed prior to being deflected, and wherein the light beam is laterally translated with regard to the optical axis of the optic by being deflected.

15. The method of claim 14, wherein the light beam is deflected at points which are arranged around an image selected from an image of the pupil of the focussing optic and an intermediate image of the scanning range.

16. The method of claim 9, wherein an electric field of at least one of the components of the coherent light beam is modulated in such a way that an integral of the electric field over the pupil of the focussing optic is zero.

17. A raster light microscope, comprising an excitation light source providing an excitation laser beam, an optic focussing the laser beam and comprising an optical axis and a pupil;

and a laser scanner dynamically shifting the excitation laser beam with regard to the optic to scan an object with the focussed excitation laser beam in a two-dimensional scanning range, the laser scanner comprising:

beam deflectors which deflect the excitation laser beam in two different directions with regard to the optical axis of the optic; and a controller for controlling the beam deflectors;

wherein each beam deflector deflects the excitation laser beam in one direction by a deflection angle which is dynamically variable by the controller;

wherein, for a first dimension of the two-dimensional scanning range, at least a first beam deflector and a second beam deflector of the beam deflectors are connected in series which are controllable independently on each other and which, in a first one of the two directions, deflect the excitation laser beam by a first deflection angle and a second deflection angle, the first deflection angle and the second deflection angle being dynamically variable by the controller independently on each other;

wherein, for a second dimension of the two-dimensional scanning range, at least a third beam deflector and a fourth beam deflector of the beam deflectors are connected in series which are controllable independently on each other and which, in a second one of the two directions, deflect the excitation laser beam by a third deflection angle and a fourth deflection angle, the third deflection angle and the fourth deflection angle being dynamically variable by the controller independently on each other and on the first deflection angle and the second deflection angle; and wherein the controller predetermines the deflection angles of all beam deflectors for each point of the two-dimensional scanning range in such a way that the excitation laser beam, in scanning the whole two-dimensional scanning range, always runs through a same point of the pupil of the focussing optic.

18. The raster light microscope of claim 17, and further comprising a stimulation light source providing a stimulation excitation beam, which is coaxial with regard to the excitation light beam and whose electric field is modulated in such a way that an integral of the electric field over the pupil of the focussing optic is zero, wherein the laser scanner dynamically shifts the modulated stimulation laser beam with regard to the optic by means of the same beam deflectors also deflecting the excitation laser beam.

* * * * *